United States Patent
Waterson et al.

(10) Patent No.: US 9,990,754 B1
(45) Date of Patent: Jun. 5, 2018

(54) SYSTEM FOR RENDERING USING POSITION BASED FINITE ELEMENT SIMULATION

(71) Applicant: Electronic Arts Inc., Redwood City, CA (US)

(72) Inventors: Tom Waterson, Fareham (GB); Chris Lewin, Guildford (GB)

(73) Assignee: ELECTRONIC ARTS INC., Redwood City, CA (US)

( * ) Notice: Subject to any disclaimer, the term of this patent is extended or adjusted under 35 U.S.C. 154(b) by 15 days.

(21) Appl. No.: 14/614,375

(22) Filed: Feb. 4, 2015

Related U.S. Application Data

(60) Provisional application No. 61/935,632, filed on Feb. 4, 2014.

(51) Int. Cl.
*G06T 13/40* (2011.01)
*A63F 13/52* (2014.01)
*G06T 19/20* (2011.01)
*G06T 17/20* (2006.01)

(52) U.S. Cl.
CPC .............. *G06T 13/40* (2013.01); *A63F 13/52* (2014.09); *G06T 17/20* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 5,982,389 A | 11/1999 | Guenter et al. | |
| 5,999,195 A | 12/1999 | Santangeli | |
| 6,961,060 B1 | 11/2005 | Mochizuki et al. | |
| 7,403,202 B1 | 7/2008 | Nash | |
| 8,395,626 B2 * | 3/2013 | Millman | G06F 17/5009 345/473 |
| 8,599,206 B2 | 12/2013 | Hodgins et al. | |
| 8,860,732 B2 | 10/2014 | Popovic et al. | |
| 9,741,146 B1 | 8/2017 | Nishimura | |
| 2002/0180739 A1 * | 12/2002 | Reynolds | G06T 13/20 345/474 |
| 2006/0149516 A1 | 7/2006 | Bond et al. | |

(Continued)

OTHER PUBLICATIONS

Parker et al., "Real-Time Deformation and Fracture in a Game Environment", Eurographics/ACM SIGGRAPH Symposium on Computer Animation (Aug. 2009), 12 pg.*

(Continued)

*Primary Examiner* — Hilina K Demeter
(74) *Attorney, Agent, or Firm* — Knobbe, Martens, Olson & Bear, LLP

(57) ABSTRACT

The present disclosure provides embodiments of systems and methods for rendering and skinning in video game applications that utilize a modified finite elements analysis in combination with position based dynamics. Position based dynamics can be used to provide a tradeoff of accuracy for speed and stability. The resulting position based finite element process provides for rendering and skinning elements, such as character models, during real time execution of a game application. Embodiments of the position based finite element technique can provide high quality deformations with a small number of elements, and simulate those elements more efficiently than previous methods used in the art.

20 Claims, 10 Drawing Sheets

(56) References Cited

U.S. PATENT DOCUMENTS

| | | | |
|---|---|---|---|
| 2007/0085851 A1* | 4/2007 | Muller | G06T 13/20 |
| | | | 345/474 |
| 2008/0049015 A1 | 2/2008 | Elmieh et al. | |
| 2008/0316202 A1* | 12/2008 | Zhou | G06T 17/20 |
| | | | 345/419 |
| 2009/0066700 A1 | 3/2009 | Harding et al. | |
| 2010/0134501 A1 | 6/2010 | Lowe et al. | |
| 2011/0012903 A1 | 1/2011 | Girard | |
| 2011/0119332 A1 | 5/2011 | Marshall et al. | |
| 2011/0128292 A1 | 6/2011 | Ghyme et al. | |
| 2011/0292055 A1 | 12/2011 | Hodgins et al. | |
| 2012/0303343 A1 | 11/2012 | Sugiyama et al. | |
| 2012/0313931 A1 | 12/2012 | Matsuike et al. | |
| 2013/0120439 A1 | 5/2013 | Harris et al. | |
| 2014/0002463 A1* | 1/2014 | Kautzman | G06T 13/40 |
| | | | 345/473 |
| 2014/0198107 A1* | 7/2014 | Thomaszewski | G06T 13/40 |
| | | | 345/473 |
| 2015/0113370 A1 | 4/2015 | Flider | |
| 2015/0187113 A1* | 7/2015 | Rubin | G06T 13/40 |
| | | | 345/473 |
| 2015/0243326 A1 | 8/2015 | Pacurariu et al. | |
| 2016/0314617 A1 | 10/2016 | Forster et al. | |
| 2016/0354693 A1 | 12/2016 | Yan et al. | |

OTHER PUBLICATIONS

Cook et al., Concepts and Applications of Finite Element Analysis, 1989, Sections 6-11 through 6-14.*
Geijenbeek et al., Interactive Character Animation Using Simulated Physics, 2011.*
Belytschko et al., "Assumed strain stabilization of the eight node hexahedral element," Computer Methods in Applied Mechanics and Engineering, vol. 105(2), pp. 225-260 (1993), 36 pages.
Belytschko et al., Nonlinear Finite Elements for Continua and Structures, Second Edition, Wiley (Jan. 2014), 727 pages (uploaded in 3 parts).
Chao et al., "A Simple Geometric Model for Elastic Deformations", 2010, 6 pgs.
Dick et al., "A Hexahedral Multigrid Approach for Simulating Cuts in Deformable Objects", IEEE Transactions on Visualization and Computer Graphics, vol. X, No. X, Jul. 2010, 16 pgs.
Diziol et al., "Robust Real-Time Deformation of Incompressible Surface Meshes", to appear in Proceedings of the 2011 ACM SIGGRAPH/Eurographics Symposium on Computer Animation (2011), 10 pgs.
Georgii et al., "Corotated Finite Elements Made Fast and Stable", Workshop in Virtual Reality Interaction and Physical Simulation VRIPHYS (2008), 9 pgs.
Irving et al., "Invertible Finite Elements for Robust Simulation of Large Deformation", Eurographics/ACM SIGGRAPH Symposium on Computer Animation (2004), 11 pgs.
Kaufmann et al., "Flexible Simulation of Deformable Models Using Discontinuous Galerkin FEM", Oct. 1, 2008, 20 pgs.
Kavan et al., "Skinning with Dual Quaternions", 2007, 8 pgs.
Kim et al., "Long Range Attachments—A Method to Simulate Inextensible Clothing in Computer Games", Eurographics/ACM SIGGRAPH Symposium on Computer Animation (2012), 6 pgs.
Macklin et al., "Position Based Fluids", 2013, 5 pgs.
McAdams et al., "Efficient Elasticity for Character Skinning with Contact and Collisions", 2011, 11 pgs.
Muller et al., "Meshless Deformations Based on Shape Matching", SIGGRAPH 2005, 29 pgs.
Muller et al., "Adding Physics to Animated Characters with Oriented Particles", Workshop on Virtual Reality Interaction and Physical Simulation VRIPHYS (2011), 10 pgs.
Muller et al., "Real Time Dynamic Fracture with Columetric Approximate Convex Decompositions", ACM Transactions of Graphics, Jul. 2013, 11 pgs.
Muller et al., "Position Based Dymanics", VRIPHYS 2006, Computer Graphics, Korea University, 23 pgs.
O'Brien et al., "Graphical Modeling and Animation of Brittle Fracture", GVU Center and College of Computing, Georgia Institute of Technology, Reprinted from the Proceedings of ACM SIGGRAPH 99, 10 pgs.
Parker et al., "Real-Time Deformation and Fracture in a Game Environment", Eurographics/ACM SIGGRAPH Symposium on Computer Animation (2009), 12 pgs.
Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.
Rungjiratananon et al., "Elastic Rod Simulation by Chain Shape Matching withTwisting Effect" SIGGRAPH Asia 2010, Seoul, South Korea, Dec. 15-18, 2010, ISBN 978-1-4503-0439-9/10/0012, 2 pgs.
Sifakis, Eftychios D., "FEM Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.
Stomakhin et al., "Energetically Consistent Invertible Elasticity", Eurographics/ACM SIGRAPH Symposium on Computer Animation (2012), 9 pgs.
Vaillant et al., "Implicit Skinning: Real-Time Skin Deformation with Contact Modeling", (2013) ACM Transactions on Graphics, vol. 32 (n° 4). pp. 1-11. ISSN 0730-0301, 12 pgs.
Cournoyer et al., "Massive Crowd on Assassin's Creed Unity: AI Recycling," Mar. 2, 2015, 55 pages.
Geijtenbeek, T. et al., "Interactive Character Animation using Simulated Physics", Games and Virtual Worlds, Utrecht University, The Netherlands, The Eurographics Association 2011, 23 pgs.
Han et al., "On-line Real-time Physics-based Predictive Motion Control with Balance Recovery," Eurographics, vol. 33(2), 2014, 10 pages.
Komura et al., "Animating reactive motion using momentum-based inverse kinematics," Computer Animation and Virtual Worlds, vol. 16, pp. 213-223, 2005, 11 pages.
Lee, Y. et al., "Motion Fields for Interactive Character Animation", University of Washington, Bungie, Adobe Systems, 8 pgs.
Levine, S. et al., "Continuous Character Control with Low-Dimensional Embeddings", Stanford University, University of Washington, 10 pgs.
Nguyen et al., "Adaptive Dynamics With Hybrid Response," 2012, 4 pages.
Orin et al., "Centroidal dynamics of a humanoid robot," Auton Robot, vol. 35, pp. 161-176, 2013, 18 pages.
Seo et al., "Compression and Direct Manipulation of Complex Blendshape Models", Dec. 2011, in 10 pgs.
Treuille, A. et al., "Near-optimal Character Animation with Continuous Control", University of Washington, 2007, 7 pgs.
Wu et al., "Goal-Directed Stepping with Momentum Control," Eurographics/ ACM SIGGRAPH Symposium on Computer Animation, 2010, 6 pages.

* cited by examiner

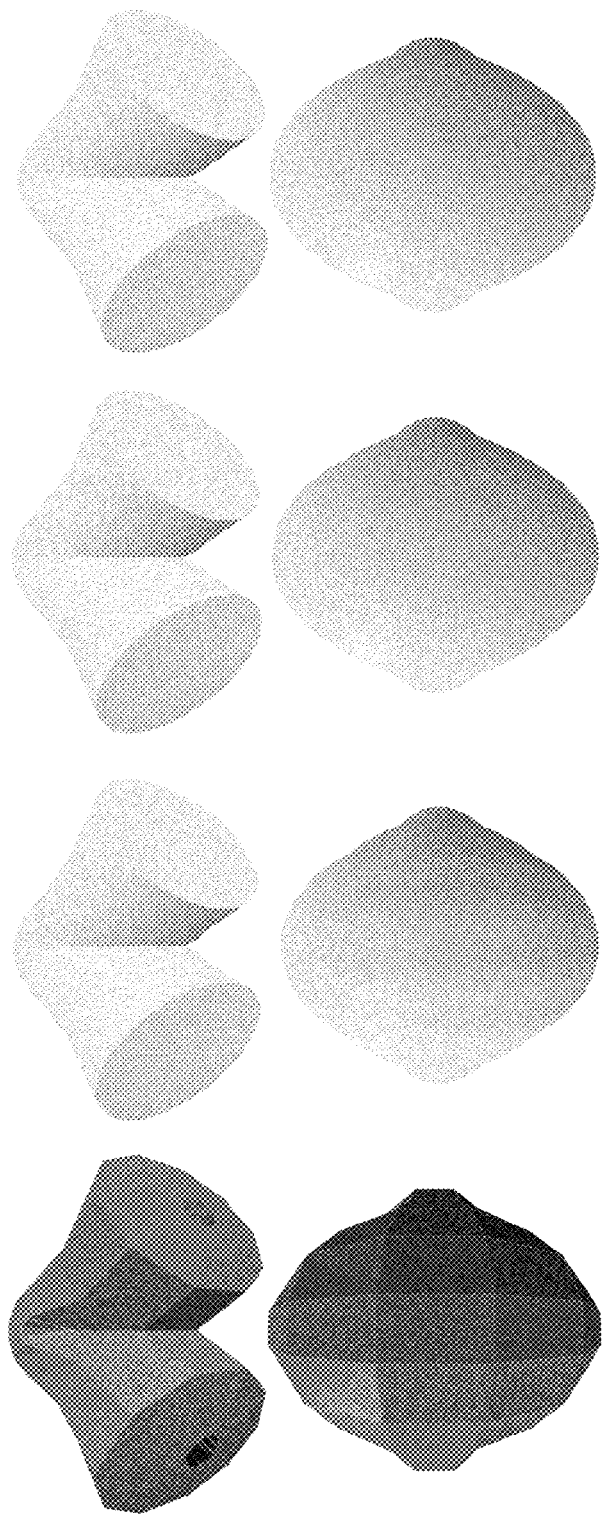

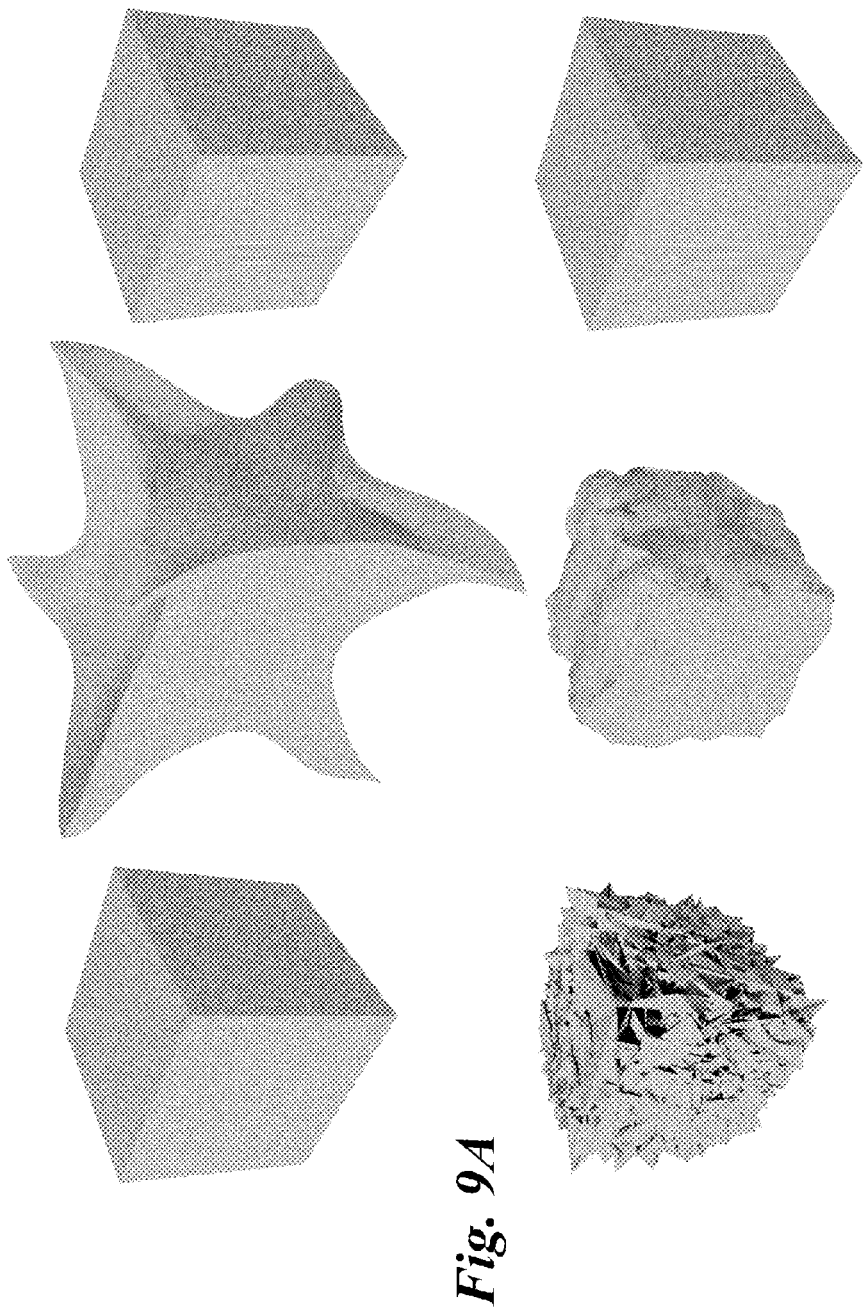

SYSTEM FOR RENDERING USING POSITION BASED FINITE ELEMENT SIMULATION

INCORPORATION BY REFERENCE TO ANY PRIORITY APPLICATIONS

This application claims priority from U.S. Provisional No. 61/935,632, filed Feb. 4, 2014, which is hereby incorporated by reference herein in its entirety.

BACKGROUND

Demand for ever increasing realism and detail in computer-implemented video games seems to drive the growth of computer performance. Unlike computer animation and movie rendering which can process individual scenes over time for playback at a higher frame rate, computer-implemented video games and computer-implemented simulators must render complete, three-dimensional (3D) scenes of a virtual world in real time, typically at a rate of thirty (30) frames per second or better. The scenes are rendered in real time in the sense that each scene typically depends in part on user-generated input signals, for example, through physical manipulation of a user input device such as a game controller, which are not predictable prior to generating the sequence of scenes. By producing and immediately displaying such scenes responsive to user-generated input signals, a virtual 3D world responsive to, and interactive with, the user is presented.

This demand has led to the development of increasingly sophisticated and speedy graphics processors for personal computers and specialized computer systems typically referred to as video game systems. Such systems come in three primary forms: Personal computer (PC) systems, Game Console systems (for example, Microsoft Xbox-One®, Sony PlayStation4®, Nintendo WiiUTM) and Hand-Held Game Systems (for example Nintendo 3DS, Sony PSP).

The computer-implemented game marketplace is highly competitive. Game players will readily switch to a game which has a more realistic and entertaining experience. Thus, any improvement in rendering efficiency which allows a game to get more content into a virtual world without sacrificing frame rate due can represent a significant competitive advantage in the marketplace.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings.

FIGS. 8A, 8B, 8C, and 8D illustrate an embodiment of a model of an elbow joint.

FIGS. 9A and 9B illustrate embodiments of results of robustness tests.

DETAILED DESCRIPTION OF EMBODIMENTS

Overview

Figure 1:
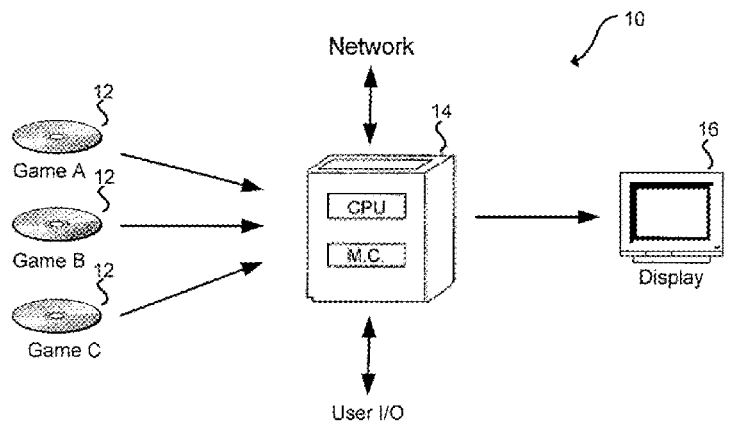
FIG. 1 illustrates an embodiment of a game system.

Skinning is the process of mapping from a static undeformed visual representation of a character to a deformed representation. In video games, this process can be achieved by various methods, such as linear blend skinning, in which deformed vertices of a render mesh are found by linear-blending their positions in the local spaces of a hierarchy of rigid bodies called a rig. While linear blend skinning can be versatile and can produce lifelike deformations, linear blend skinning has no sense of the volume of the skinned character's body and cannot reproduce dynamic effects, such as the jiggling of fat and friction in self-contact.

Simulation of elastic solids, also referred to as soft body simulation, can be used to produce effects, such as self-contact and volumetric bulging in animation. Techniques for simulation of elastic solids can include the force-based finite element method, which has been used for rendering animation in film production and other prerendered animation. The force-based finite element method can be used to address specific needs for prerendering animation, including stable and efficient hyperelastic material models, resistance to inversion, and appropriate element technology. However, the force-based finite element method operates at speeds that are orders of magnitude higher than can used for rendering elements in a real time environment. Generally, a secondary effect like soft body simulation can be afforded approximately 3 milliseconds per frame on one central procession unit (CPU) thread, and a similar amount of time on a single graphics processing unit (GPU) compute unit.

The present disclosure provides embodiments of systems and methods for real time rendering and skinning in video game applications that utilizes a modified finite elements analysis in combination position based dynamics. Position based dynamics can be used to provide a tradeoff of accuracy for speed and stability. The resulting position based finite element process provides for rendering and skinning elements, such as character models, during real time execution of a game application. The position based finite element technique can provide high quality deformations with a small number of elements, and simulate those elements more efficiently than previous methods used in the art.

The present disclosure also provides systems and methods for tracking the rotations of deformable bodies. Problem associated with tracking rotations of elements can be a bottleneck during rendering. The rotational tracking is based, at least in part, on physical arguments rather than standard matrix decompositions. The rotational tracking retains the robustness under inversion while requiring less computations than singular value decomposition. In some embodiment, the rotational tracking can require less than a quarter of the computations of singular value decomposition.

In some embodiments, using PBF with a set of global constraints and a GPU solver, can simulate more than 10,000 elements in 3 milliseconds time. Using PBF in combination with appropriate mesh authoring tools can provide realistic deformations for multiple characters in a real time execution of a game application.

Overview of Game System Embodiments

These techniques may be implemented in software, hardware, or a combination thereof, and may be incorporated into video games and/or other simulations to simulate elastic solids. For example, the techniques for simulating elastic solids may be incorporated into a rendering engine used to determine the movement of objects and/or characters in a video game or other simulated environments. A rendering engine incorporating these techniques may be used to determine deformation of elements for rendering and skinning a character model within a simulated environment. The rendering engine can generate a visual representation of the simulated environment.

The techniques disclosed herein may be used in a variety of types of video games and/or other simulated environments that provide real-time rendering and skinning of character animations. Such simulations can include sports games, action games, or other games. One skilled in the art will recognize that the use of the techniques described herein is not limited solely to the rendering and skinning of character animations, and that these techniques may also be incorporated into other types of simulations for skinning and rendering other objects and environments as appropriate.

FIG. 1 illustrates game system 10 for providing one or more games to a user according to embodiments of the present disclosure. System 10 is includes one or more game media 12 (game A, game B, game C), a game device 14, and a display 16.

Game media 12 may include any game applications that may be used by game device 14 to involve a user in a game. Each game medium 12 includes logic to provide a game, denoted as game A, game B, and game C. In one embodiment, the game provided by game device 14 is an electronic video game. Games are each individually stored on media, such as compact disk read-only memories (CD-ROMs), digital versatile disks (DVDs), game cartridges, or other storage media. A game, such as game A, is inserted in, coupled to, or in communication with game device 14 so that game device 14 may read all or part of a game application and/or related game data found on game media 12. Some games might also be integrated into game device 14.

Game device 14 is a computing device that includes one or more processors, such as central processing units (CPUs), graphics processing units (GPUs), and data storage combined or in separate elements. Game device 14 may also be connected to a network and game device 14 may access games that are not included on game media 12. Thus, according to one embodiment, game A, game B, and/or game C may be accessed through the network, in whole or in part, and not be individually stored on game media 12. To allow a user to select from a plurality of available games available on game media 12 or via the network, a display 16 might present a list of the games provided by game applications on game media 12.

A game application may be also referred to as a game code and/or a game program. A game application should be understood to include software code that game device 14 uses to provide a game for a user to play. A game application might comprise software code that informs game device 14 of processor instructions to execute, but might also include data used in the playing of the game, such as data relating to constants, images and other data structures created by the game developer including prerecorded animation data. A user interacts with the game application and game device 14 through user input/output (I/O) devices.

Figure 2:
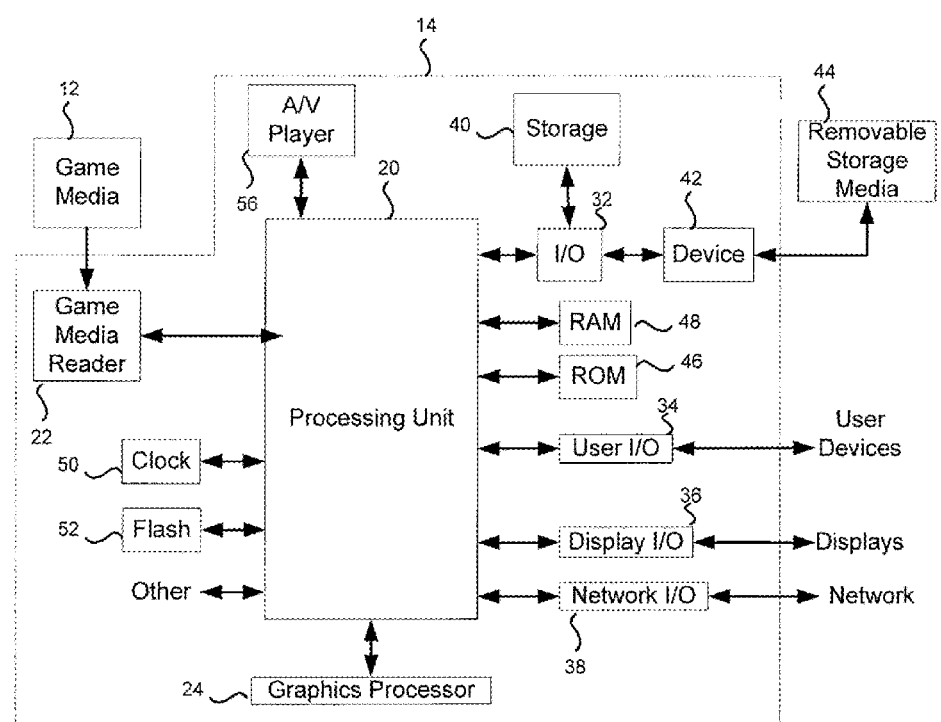
FIG. 2 illustrates an embodiment of game device.

FIG. 2 illustrates an embodiment of game device 14 according to the present disclosure. It should be understood that other variations of game device 14 may be substituted for the examples explicitly presented herein and may be appreciated by a person of skill in the art. As shown, game device 14 includes a processing unit 20 that interacts with other components of game device 14 and also external components to game device 14. A game media reader 22 is included that communicates with game media 12. Game media reader 22 may be a CD-ROM or DVD unit that reads a CD-ROM, DVD, or any other reader that can receive and read data from game media 12.

Game device 14 may include a separate graphics processor 24. Game device 14 might be a handheld video game device, a dedicated game console computing system for operating computer games such as video games, a general-purpose laptop or desktop computer, a smart phone, a tablet, a car console, or other suitable system.

Game device 14 also includes various components for enabling input/output, such as an I/O 32, a user I/O 34, a display I/O 36, and a network I/O 38. I/O 32 interacts with storage element 40 and, through a device 42, removable storage media 44 in order to provide storage for game device 14. Processing unit 20 communicates through I/O 32 to store data, such as game state data and any shared data files. In addition to storage 40 and removable storage media 44, game device 14 is also shown including ROM (read-only memory) 46 and RAM (random access memory) 48. RAM 48 may be used for data that is accessed frequently, such as when a game is being played.

User I/O 34 is used to send and receive commands between processing unit 20 and user devices, such as game controllers. Display I/O 36 provides input/output functions that are used to display images from the game being played. Network I/O 38 is used for input/output functions for a network. Network I/O 38 may be used if a game is being played online or being accessed online.

Display output signals produced by display I/O 36 comprising signals for displaying visual content produced by game device 14 on a display device, such as graphics, user interfaces, video, and/or other visual content. Game device 14 may comprise one or more integrated displays configured to receive display output signals produced by display I/O 36. According to some embodiments, display output signals produced by display I/O 36 may also be output to one or more display devices external to game device 14, such a display 16.

The game device 14 can also include other features that may be used with a game, such as a clock 50, flash memory 52, and other components. An audio/video player 56 might also be used to play a video sequence, such as a movie. It should be understood that other components may be provided in game device 14 and that a person skilled in the art will appreciate other variations of game device 14.

Program code can be stored in ROM 46, RAM 48 or storage 40 (which might comprise hard disk, other magnetic storage, optical storage, other storage or a combination or variation of these). In a common arrangement, part of the program code is stored in ROM that is programmable (ROM, PROM, EPROM, EEPROM, and so forth) and part of the program code is stored on removable media such as game media 12 (which can be a CD-ROM, cartridge, memory chip or the like, or obtained over a network or other electronic channel as needed). In general, program code can be found embodied in a tangible signal-bearing medium.

RAM 48 (and possibly other storage) is usable to store variables and other game and processor data as needed. Typically, RAM is used and holds data that is generated during the play of the game and portions thereof might also be reserved for frame buffers, game state and/or other data needed or usable for interpreting user input and generating game displays.

As game device 14 reads game media 12 and provides a game, information may be read from game media 12 and stored in a memory device, such as RAM 48. Additionally, data from storage 40, ROM 46, servers through a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

Figure 3:
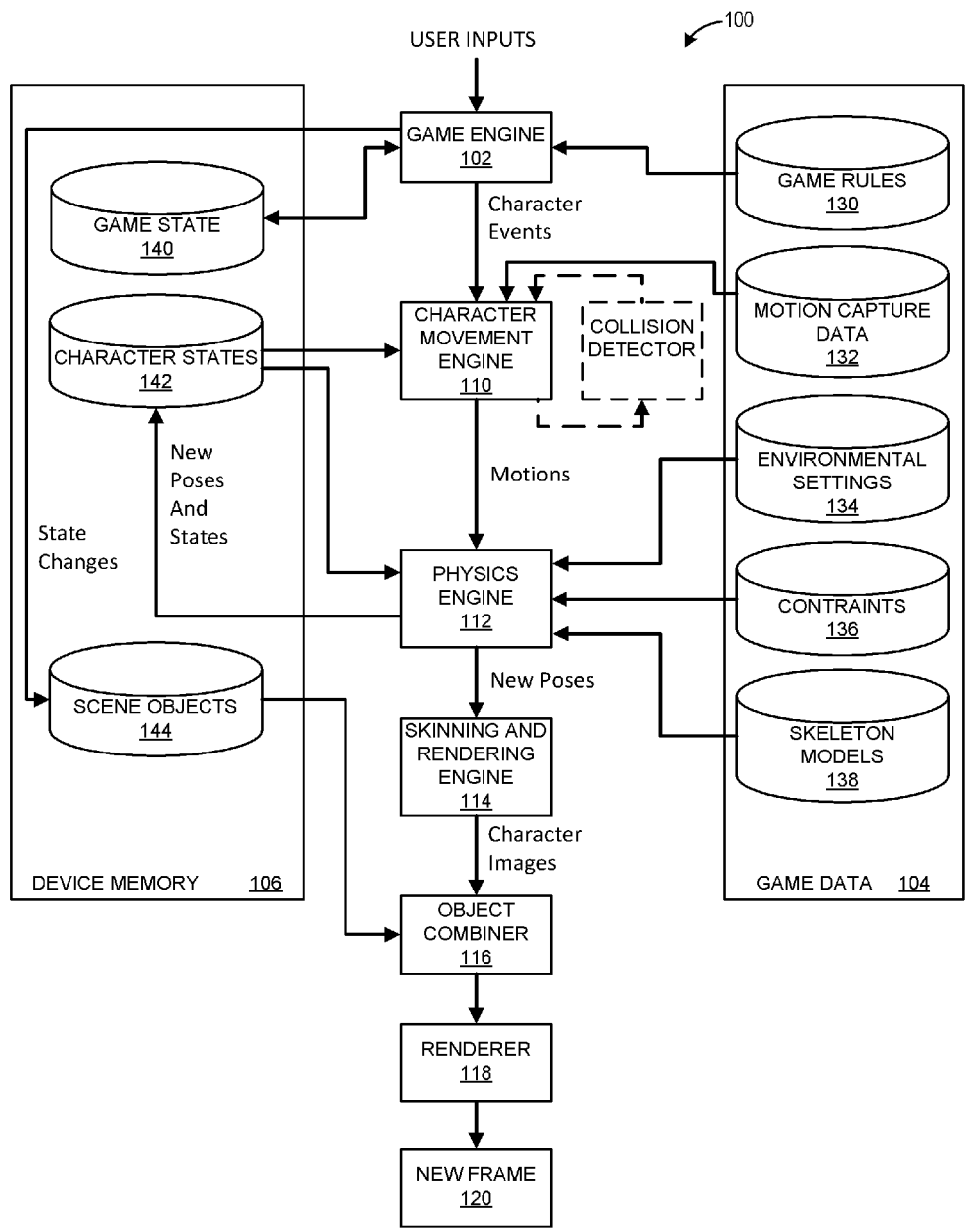
FIG. 3 illustrates an embodiment of elements of a game system.

FIG. 3 illustrates an embodiment some elements of game system 10 in more detail, especially those involved in character movement processing. Game device 14 provides for user input to control aspects of the game according to game rules. Game rules might be specified in instruction form on game media 12. Examples of game rules include rules for scoring, possible inputs, actions/events, movement in response to inputs, and the like. Other components control what inputs are accepted and how the game progresses, but the focus is on the elements used for generating suitable animation based on various inputs.

As shown in FIG. 3, by system 100, user inputs and game code/data are used to generate display video. The game system also handles playing the game and presenting corresponding audio output, but this explanation is primarily focused on generating frames of display video for the game. A game engine 102 receives the user inputs and determines character events, such as tackles, collisions, runs, throws, and dog piles or other events appropriate for the game.

Those character events are conveyed to a character movement engine 110 that determines the appropriate motions the characters should make in response to the events and passes those motions on to a physics engine 112. Physics engine 112 determines new poses for the characters and provides those new poses to a skinning and rendering engine 114. Engine 114 in turn provides character images to an object combiner 116 to combine animate, inanimate and background objects into a full scene. The full scene is conveyed to a renderer 118, which generates a new frame 120 therefrom.

Game code/data 104 is shown comprising game rules 130, prerecorded mo-cap poses/paths 132, environmental settings 134, strength and velocity constraints 136, and skeleton models 138. The device executing the game might have memory 106 for game state 140, character states 142 and scene object storage 144. Character states 142 comprise storage for a current pose of characters being animated.

In operation, game engine 102 reads in game rules 130 and considers game state 140 to arrive at character events. Character movement engine 110 reads in prerecorded poses/paths 132 as well as character states 142 and with an optional collision detector process derives the desired motions for characters. Motions might be expressed as a set of external forces, target poses and the like. As needed, character movement engine 110 may also use other data elements shown, such as rigs or skeleton models 138. Rigs are often used in character animations. A typical rig may comprise a collection of character components, such as a skeletal structure and a mesh to be skinned over the skeletal structure. A typical rig comprises a skeletal structure for a character and includes a plurality of degrees of freedom. A rig may also comprise a set of animation controls that enable an animator to move the various components of the character in order to create motion in an animation. Character movement engine 110 might also introduce character movements for randomness, personality, and so forth.

Physics engine 112 has as its inputs the skeleton models of various characters, character states such as current poses (for example, positions of body parts expressed as positions, joint angles or other specifications), and velocities (linear and/or angular) of body parts and motions provided by character movement engine 110, which can be in the form of a set of force/torque vectors for some or all body parts. From this information, physics engine 112 generates new poses for the characters using rules of physics and those new poses can be used to update character states 142 and are also provided to rendering engine 114. Where invisible skeleton models are used, character states 142 might contain current position of visible "graphics" characters as well as the invisible rag-doll skeleton characters.

The skinning and rendering engine 114 takes into account the surfaces, colors and textures of the body parts of posed characters and renders character images. Object combiner 116 can then combine those character images with inanimate and background objects obtained from scene objects store 114 to provide a complete scene to renderer 118. The skinning and rendering engine can provide a framework for implementing the position based finite element techniques and rotational tracking disclosed herein.

Position Based Finite Element Process

Figure 4C:
FIGS. 4A, 4B, and 4C illustrate an embodiment of an implementation of position based finite element technique being applied to an elbow joint.
Figure 4B:
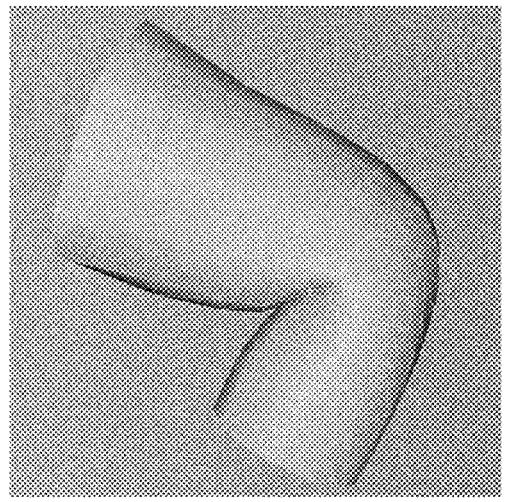
Figure 4A:

The position based finite element process (PBF) provides results that approach the quality of using a force-based finite element method at a fraction of the computation time. FIGS. 4A-C illustrate an implementation of an embodiment of PBF being applied to an elbow joint of a video game character. FIG. 4A illustrates using linear blend skinning, in which volume of the skinned mesh is not preserved and there is noticeable interpenetration. FIGS. 4B-4C illustrate an implementation of PBF using a simulation on a mesh of 288 hexahedral elements, with no self-collision. A portion of the mesh is illustrated in FIG. 3B and the final result is illustrated in FIG. 4C. In this embodiment, the resulting operation took less than 0.2 milliseconds per frame on a single GPU compute unit. The resulting deformation illustrated in FIG. 4C is substantially improved.

The PBF utilizes finite element constructs. PBF can use any shape or type of element, such as tetrahedron, hexahedron, pyramidal, and the like. Some shapes, such as linear tetrahedral elements are susceptible to a phenomenon known as volumetric locking.

Figure 5C:
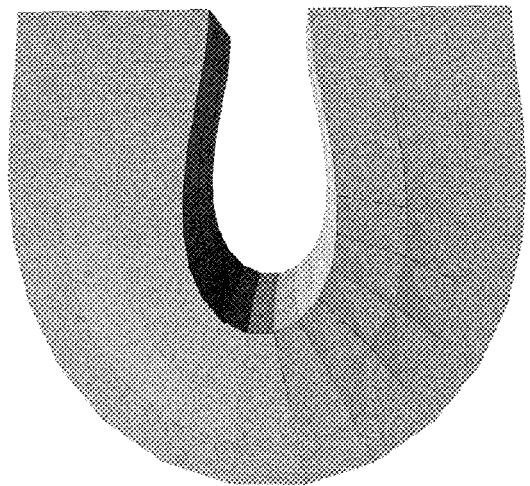
FIGS. 5A, 5B, and 5C illustrate an embodiment of an implementation of volumetric locking.
Figure 5B:
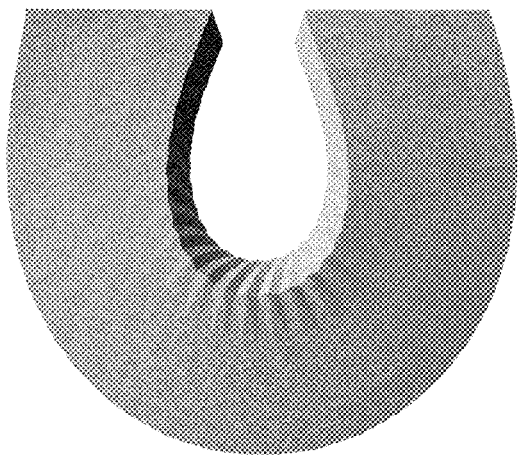
Figure 5A:
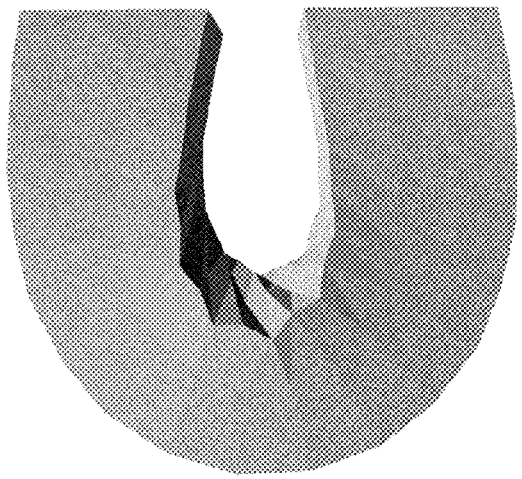

FIGS. 5A-C illustrate embodiments that show a demonstration of volumetric locking. Meshes illustrated in FIG. 5A and 5B use tetrahedral elements. FIG. 5A represents a mesh of 855 tetrahedral elements and FIG. 5B represents a mesh of 3840 tetrahedral elements. FIG. 5C illustrates a mesh using one-point integrated hexahedral elements. FIG. 5C represents a mesh of 171 one-point integrated hexahedral elements. FIGS. 5A-C are bent into a C-shape under a volume constraint. The sawtooth pattern exhibited in the tetrahedral meshes is caused by volumetric locking, which is present when mesh is coarse (FIG. 5A) or refined (FIG. 5B). The linear tetrahedral elements, under both shape-preserving and volume-preserving forces, are unable to represent a smooth deformation field. Whereas, even at a low resolution mesh, the deformation produced by the hexahedral mesh (FIG. 5C) remains relatively smooth.

The selected elements can have regular and irregular grids. Regular grids have the same size elements and can have a higher performance per element. Irregular grids can uses different size elements, which can provide the freedom to concentrate mesh detail in areas that most need additional elements. This can provide better overall performance and make up for the deficit in performance per element. In some embodiments, the PBF uses irregular linear hexahedral elements.

Discretization

Figure 6:
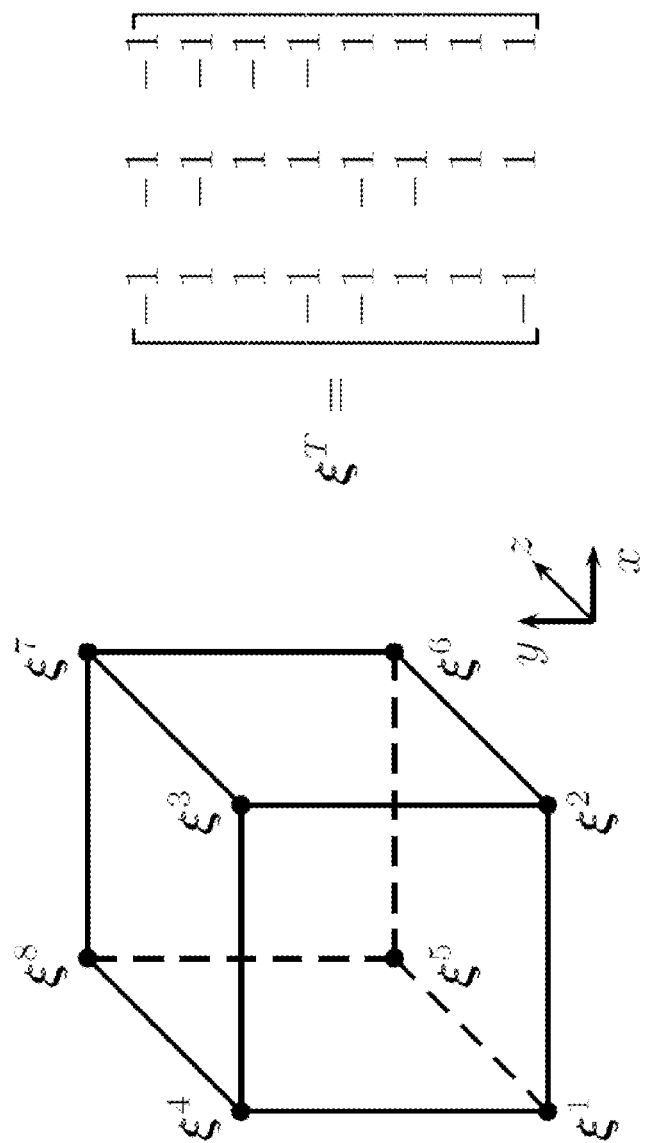
FIG. 6 illustrates an embodiment of a linear hexahedral reference element configuration.

Discretization of an object can be performed using finite element constructs. Some embodiments of some finite element methods (FEM) can be found in SIFAKIS, E., AND BARBIC, J. 2012. Fem simulation of 3d deformable solids: A practitioner's guide to theory, discretization and model reduction. In *SIGGRAPH* 2012 Courses, which is incorporated by reference herein. FIG. 6 illustrates an embodiment of a linear hexahedral reference element configuration. When using irregular linear hexahedral elements, the deformation field of the elements can be represented by two transforms: (1) from reference coordinates $\zeta$ to undeformed coordinates X, and (2) from X to deformed coordinates x. To calculate forces and energies the deformation gradient tensor $F(\zeta)=\partial x/\partial \zeta$ is computed. When using a one-point quadrature, the value at the center of the element can be used: $F^e = F(0)$. In some embodiments, the deformation gradient can be computed as:

$$F^e = \frac{1}{8}\left(\sum_{j=1}^{8} X^j \otimes \xi^j\right)^{-1} \sum_{i=1}^{8} x^i \otimes \xi^i, \quad (1)$$

$$= \frac{1}{8} J^{e-1} \sum_{i=1}^{8} x^i \otimes \xi^i,$$

where $x^i$, $X^i$ and $\zeta^i$ are the positions of node i in the current, undeformed and reference configuration respectively. The node orderings and values of $\zeta^i$ are illustrated in FIG. 6. $J^e \equiv J(0)$ is the element Jacobian $J(\zeta)=\partial X/\partial \zeta$ evaluated at the central quadrature point, and $a \otimes b = ab^T$ is the tensor product.

In one embodiment, using the deformation gradient, the one point approximation to the quantities used for simulation can be computed, including the elemental elastic energy $E \approx V_0 \Psi(F^e)$ and the elemental nodal forces:

$$f^i \approx -V_0 P(F^e) J^{e-T} \zeta^i, \quad (2)$$

where $V_0 8 \det(J^e)$. The functions $\Psi(F(\zeta))$ for strain energy density and $P(F(\zeta))$ for the 1st Piola-Kirchhoff (PK1) stress tensor are defined by the selected material model. The material model is further discussed herein.

Position Based Solver

Elastic behavior can be achieved using a relaxed Newton iteration on constraint equations. In one embodiment, the constraint function $C:\mathbb{R}^{3n} \to \mathbb{R}$, can be used to solve for equality ($C(x^1, \ldots, x^n)=0$) or inequality ($C(x^1, \ldots, x^n) \geq 0$) by directly moving the particles involved in the constraint along its gradient:

$$\Delta x^i = s w^i \nabla_{x^i} C(x^1, \ldots, x^n), \quad (3)$$

where $w^i \approx 1 m^i$ is the inverse mass of node i, and the scaling factor s is:

$$s = -k \frac{C(x^1, \ldots, x^n)}{\sum_{j=1}^{n} \omega^j |\nabla_{x^j} C(x^1, \ldots, x^n)|^2}, \quad (4)$$

where k is a relaxation factor between 0 and 1. When k=1 the equation converges as fast as possible, which leads to the stiffest possible behavior. By decreasing k, softer behavior of the element can attained. A modified integration loop can be used to track velocities as well as positions. The velocity updates can be derived from the position updates:

$$\Delta v^i = \Delta x^i / \Delta t. \quad (5)$$

In some embodiments, the velocities are consistent with the current position of the particle. The requirements on any constraint functions used in this process are fairly relaxed and are configured to behave well under the Newton iteration. This process incorporates a much broader set of functions than those permitted in force-based finite element methods, which are typically required to be positive-definite.

The constraints are a generalization of energies. In some embodiments, any energy function can automatically satisfy the requirements for a constraint equation. The constraint gradients for a given energy can be the forces associated with that energy. Formulating a position based finite element analysis can be computed using the strain energy and nodal forces for each element. One embodiment of position based dynamics constraint solving for hexahedra is encapsulated in Algorithm 1:

---
Algorithm 1 PBD constraint solving for hexahedra
--- function SOLVECONSTRAINT(C, f, k)

$\quad s \leftarrow -kC / \sum_{i=1}^{8} w^i |f^i|^2$ $\quad p^i \leftarrow p^i + sw^i f^i$ $\quad v^i \leftarrow v^i + sw^i f^i / \Delta t$ end function

---

Hourglass Control

One-point quadrature can be used to achieve acceptable performance with linear hexahedra. However, the one-point quadrature can require additional stabilization. The instabilities can arise from the insensitivity of $F^e$ to certain deformation modes, often referred to as hourglass modes. The process of restoring sensitivity to these modes can be referred to as hourglass control and can be represented by a stabilization constraint. A control method can be used that computes $F^e$ as the sum of gradients calculated at the element edges.

Material Model

Co-rotation al material models can be used when determining elasticity in computer graphics. By carefully calculating the element rotation R, linear co-rotational models can maintain a continuous force response under inversion that works to un-invert the element. One embodiment of a material model includes three constraints: (1) a co-rotational energy constraint, (2) the stabilization constraint for the energy, and (3) a linear volume constraint. In some embodiments, the co-rotational energy constraint is:

$$C_{CR}(F) = \psi_{CR}(F) = \frac{1}{2}\|F - R\|_F^2, \quad (9)$$

with the associated stress:

$$P_{CR}(F) = F - R. \quad (10)$$

The stabilization constraint is referred to in reference to hourglass control. In some embodiments, the volume constraint is:

$$C_V(F) = \det(F) - 1, \quad (11)$$

which has the stress tensor:

$$P_V(F) = \det(F) F^{-T}, \quad (12)$$

The constraint is linear, which prevents its use as a traditional force-based penalty term. However, using position based dynamics, the constraints are solved rather than minimized as in force based methods, which means a broader class of functions can be incorporated into the material model.

Unlike other volume constraints based on the accurate det(F) metric, such as the Neo-Hookean penalty term log(det(F)), this constraint is continuous under inversion. Additionally, in position based dynamics, the more nonlinear a constraint is the slower it will converge due to the behavior of the Newton iteration, which means the linear constraint is subjectively much stronger than equivalent quadratic or logarithmic constraints.

Figure 7A:
FIGS. 7A and 7B illustrate an embodiment of a comparison of volume constraints.
Figure 7B:
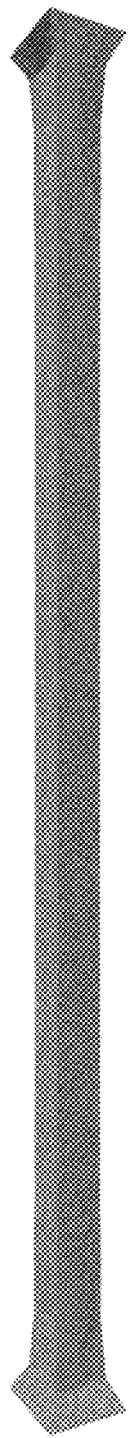

Some advantages of an accurate volume term become apparent when a mesh is subjected to high strains. FIGS. 7A-7B illustrates one embodiment a comparison of volume constraints. FIG. 7A illustrates a standard constraint. FIG. 7B illustrates a mesh using the volume constraint in equation 11 and co-rotational term $\text{tr}^2$ ($R^T F - II$). The meshes are stretched to 2.5x their original length. The application of the standard term causes the mesh to lose 90% of its volume (FIG. 7A), the mesh using the volume constraint above and the co-rotational term gains 1.2% volume. In some embodiments, catastrophic volume loss can be prevented or greatly reduced.

In some embodiments, three relaxation factors can be used to control the behavior of the material: (1) the shape-preserving stiffness $k_x$ is applied to the energy constraint, (2) the hourglass stiffness $k_{hg}$ is applied to the hourglass constraint, and (3) the volume-preserving stiffness $k_v$ is applied to the volume constraint. In some embodiments, all three parameters are 1, which can get the fastest convergence. In high-strain regions such as the joints of characters, the value of $k_s$ can be decreased to achieve the bulging behavior required.

An overview of one embodiment of a simulation loop for the position based finite element process is illustrated by Algorithm 2 below:

---
Algorithm 2 Position Based Finite Elements update loop

```
for all particles i do
    p^i ← p^i + Δtv^i
    v^i ← v^i + Δtf_ext^i
end for
DETECTCOLLISIONS(p^i)
for all elements i do
    UPDATEROTATION(R^i)
end for
for i = 1 to max iterations do
    for all elements j do
        SOLVECOLLISIONS( )
        F^e ← (1/8) J^{e-1} Σ_{k=1}^{8} x^k ⊗ ξ^k
        Compute C_CR, C_HG, C_V, f_CR, f_HG, f_V (Section 3)
        SOLVECONSTRAINT(C_CR, f_CR, k_s)
        SOLVECONSTRAINT(C_HG, f_HG, k_hg)
        SOLVECONSTRAINT(C_V, f_V, k_v)
    end for
end for
for all elements i do
    DAMPVELOCITIES( )
end for
```
---

Rotational Tracking of Elements

In some embodiments, co-rotational material models can require computation of an elemental rotation matrix R, defined by the polar decomposition of the deformation gradient F=RS. In computer graphics, this operation can generally be done via matrix decompositions applied to F using symmetric diagonalization or singular value decomposition (SVD). Although symmetric diagonalization can be computationally faster than SVD, symmetric diagonalization can break down when elements are inverted. In which case, symmetric diagonalization produces reflections rather than rotations which inhibits untangling the mesh.

Embodiments of the techniques for rotational tracking used herein use a physical method instead of matrix decompositions. In one embodiment, the rotational tracking technique is based on minimization or reduction of angular momentum. When considering a deformable body consisting of n particles, in some embodiment, the current configuration and template (previous) configuration in the center of mass frame can be denoted as $x_c^i = x_t - P_c^t$ and $T_c^i = R(X^i - P_c^0)$ respectively, where $P_c^t$ is the center of mass of the element at time t. The particles can be envisioned to move between the two configurations at a constant velocity $v^i = x_c^i - T_c^i$, such that the template configuration morphs into the current configuration in one time unit. In some embodiments, the rotation which best represents the current configuration of the element is that which causes this motion to involve deformation only, or in other words that the total momentum of the body is conserved when moving between the configurations. Because both configurations are relative to the center of mass, moving between the configurations does not change the linear momentum of the system. The goal of the process in this embodiment is to determine the rotation R such that this motion does not change the angular momentum of the system:

$$\Delta L(R) = \int_0^1 \sum_{i=1}^n x^i(t) \times m^i v^i(R) dt, \tag{13}$$

which reduces to:

$$\Delta L(R) = \sum_{i=1}^n m^i (T_c^i \times x_c^i). \tag{14}$$

Note that $\Delta L(R) = L_0(R)$, the angular momentum at t=0. Based on this rotational distance metric, the following algorithm is defined to find a valid rotation. In some embodiments, given a candidate R is used to compute $L_0$, and thus the angular velocity $\omega = I^{-1}L$ between the shapes:

$$\omega_0(R) = R I_0^{-1} R^T L_0(R), \tag{15}$$

where $I_0$ is the inertia tensor of the initial configuration. The rotation update $\omega_0$ is applied to R and repeated if required. Using a warm starting (for example, using the stored R from the previous frame as the first candidate rotation) can produce an acceptable rotation in one iteration. However, the method still converges for initial guesses that are less optimal (such as R=II). This method assumes the inertia to be constant over the motion, which can cause $\omega_0$ to be slightly inaccurate in the presence of large strains. Fortunately, this inaccuracy only affects the length and not the direction of $\omega_0$, which can be compensated for by introducing a relaxation factor $k_r$ between 0 and 1 to attenuate the rotation update in the specific case of large stretch ratios.

Using a quaternion representation and the small-309 angle approximation, in one embodiment, a fully branchfree version of this algorithm uses only a single inexact square root for error control as illustrated in Algorithm 3:

---
Algorithm 3 Rotation estimation for hexahedra with warm start
--- function UPDATEROTATION(q)
  $R \leftarrow \text{TOMATRIX}(q)$
  $L_0 \leftarrow \sum_{i=1}^{8} m^i (T_c^i \times x_c^i)$
  $\omega \leftarrow R I_0^{-1} R^T L_0$
  $u \leftarrow \begin{pmatrix} 1 \\ k_r w/2 \end{pmatrix}$ // Quaternion form, assuming small angles
  $q \leftarrow (qu/|qu|)$ // Using inexact RSQRT
end function

---

This method can produce true rotations, which avoids spurious reflections encountered when using symmetric diagonalization. Note that this method of tracking rotations works as long as one can calculate angular momentum and inertia, which means it is well defined even when mass is not lumped to the nodes. This algorithm can also be used with other techniques that use deformable body rotations, such as shape matching.

This method does not produce the same results as an SVD applied to F: because this tensor varies over the element. The rotation computed from its SVD will vary as well. This method computes an optimal global rotation for the entire element considered as a deformable body.

During testing of this method of rotational tracking as compared to the fastest known SVD, the processing time for this method was approximately 200 ns per hexahedral rotation estimation, whereas the processing time for the SVD method was approximately 860 ns per decomposition. Both codes ran using scalar instructions on a single thread. The rotations produced by this method matched those obtained from an SVD when applied to un-inverted tetrahedra, but differed in nature when applied to inverted tetrahedra.

Exemplary Implementation

The following provides embodiments of exemplary implementations, which are not to be construed as limiting.

The position based finite element techniques have been implemented using CPU and GPU versions of the algorithm. On the CPU, a Gauss-Seidel strategy was used, whereas on the GPU a Jacobi strategy was used. In an exemplary implementation, the technique uses irregular meshes. The use of irregular meshes can require more indirection than other methods that are designed for fast GPU performance. In one implementation, the method stores 284 bytes of data per element when using full precision. Using a red-black Gauss Seidel strategy on the GPU, the memory accesses required to constantly stream in the 8 or more different element colorings degraded performance by more than 75%. As a rule of thumb, Jacobi iteration in PBD generally converges about twice as slowly as Gauss-Seidel, which means Jacobi is a good choice for the GPU solver.

A special solver was implemented, which holds all degrees of freedom in the GPU's shared memory. This solver (GPU-Local) is about 50% faster than using main memory for the same task (GPU-Global), and is arithmetic logic unit (ALU) rather than bandwidth bound. This made it a good candidate to run alongside bandwidth bound tasks, of which there are many in an average video game workload.

Use in Games: Similar to cloth simulation, the use of soft body physics can be separated into environmental and character use cases. While some of the techniques are general and could be useful for any application, use of tetrahedral elements can be beneficial for character skinning applications where resistance to volumetric locking and inversion are important. The test cases and examples are targeted towards this use case. The method can be used as a viable technique for soft body skinning that can be used in real time.

In an exemplary implementation of the motion-based finite element technique for soft body skinning, the technique works on top of a traditional linear-blend skinning workflow. To create the simulation mesh, an artist creates splines that define the central axes of cylindrical sections of the simulation mesh. The central tube of nodes are marked as kinematic, and can be moved to their positions defined using linear blend skinning each frame. They participate in adjacent elements by contributing to their elastic energy, but act as if they are immovable when used to calculate the PBD constraint gradients. To allow the mesh to follow the very fast animations often encountered in video games, a quasi-static process is approximated by moving the non-kinematic nodes to their skinned positions at the beginning of each frame, solving purely from the skinned position. This scheme converges quickly enough in order to achieve good results with a small number (<10) of solver iterations.

Experiments with rigging characters using this method suggests that the number of elements required to obtain attractive deformations is in the hundreds per joint, which is substantially fewer than the thousands by other methods. The number of elements could be in the low thousands to skin the major joints of a video game character with this method.

Collision and Contact: For self-collision a BSP tree was built for each frame of an artist-chosen subset of the surface nodes, then tested a subset of the surface hexahedra against the tree. For any detected collisions, contact constraints were generated which push the offending node out of the violated hexahedron. These constraints are enforced each solver iteration. Environmental collision is a much less complex problem, on the GPU each node is tested against a fixed number of colliders without using a broadphase. Generally, for many skinning applications a substantial improvement over linear blend skinning is achieved without using self-collision at all.

Skinning: To skin a render mesh to the FEM lattice can be done based on the principles of KAUFMANN, P., MARTIN, S., BOTSCH, M., AND GROSS, M. 2008. Flexible simulation of deformable models using discontinuous galerkin fem. In Proceedings of the 2008 ACM SIGGRAPH/Eurographics Symposium on Computer Animation, Eurographics Association, Aire-la-Ville, Switzerland, Switzerland, SCA 2008, 105-115, which is incorporated by reference. Accurate reconstruction of the displacement field $\varphi(X)$ requires determination and storing of a set of parent coordinates $\zeta$ and Jacobian $J(\zeta^v)$ per vertex, then computing the deformation gradient $F(\zeta^v)$ at runtime. This process can be computationally complex and can provide only $C_0$ continuity at best.

Rather, an approximate method can be used to reconstruct the FEM deformation field. Samples of the discontinuous field defined by using only $F^e$ can be blended. In this scheme one 4×4 transform matrix per element is stored instead of a $J^e$ matrix per vertex-element pair. Continuity is achieved by linear-blending these samples per render mesh vertex. The amount of elements per vertex required to reconstruct a reasonable surface varies with the simulation mesh topology and level of continuity desired; with the cubic lattices generated by the authoring scheme and simple gaussian weighting, $C^0$ continuity can be achieved with 7 samples, or $C^1$ continuity with 27 samples. In some embodiments, 7 samples may be sufficient for the moderate strains encountered in flesh simulation, which is illustrated in FIGS. 8A-D.

FIGS. 8A-D illustrate embodiments of a model of an elbow joint. A low resolution FEM simulation mesh of 180 elements (FIG. 8A) is used to skin high resolution render meshes using one element per vertex (FIG. 8B), seven elements per vertex (FIG. 8C), and 27 elements per vertex (FIG. 8D).

FIGS. 9A and 9B illustrate embodiments of the results of robustness tests. In FIG. 8A the mesh is fully inverted. In FIG. 8B the nodes are moved to random positions inside a unit cube. The system resolves both cubes using the techniques described herein.

Behaviour: Recovery from inversion and high stretch ratios can be challenging for rotational tracking. Instability of the rotational tracking can occur at large strains. In some embodiments, the rotational tracking is stable up to extensions of 2.5 without relaxation, with relaxation, such as $k_r=0.1$, extensions of more than 6 times can be achieved.

Performance: The goal when optimizing performance for games is not often to achieve the best possible scaling to large numbers of elements, but instead to solve a sufficient number of elements as quickly as possible. The solver can run 10 iterations on 1024 elements in 4.3 ms on one CPU thread. On a single GPU thread group, the same number of elements can be simulated in 0.45 ms. These numbers were acquired using a 2.4 GHz Intel Xeon CPU and a GeForce 660 Ti GPU.

Figure 10:
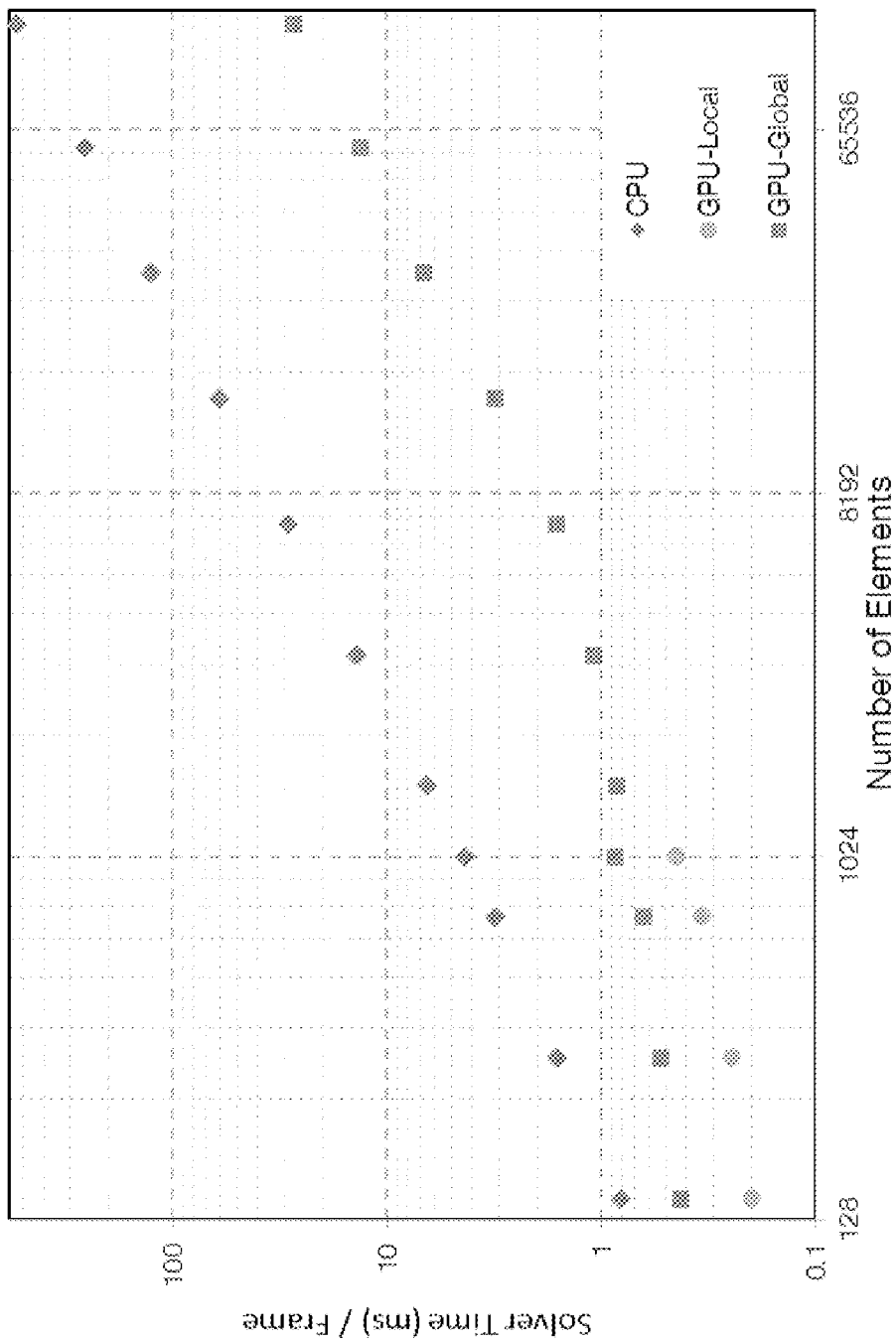
FIG. 10 illustrates an embodiment of comparisons of solver performance.

FIG. 10 illustrates a embodiments of a comparison of solver performance (omitting collision detection) on CPU and GPU. Each solver performs 10 iterations.

Figure 11B:
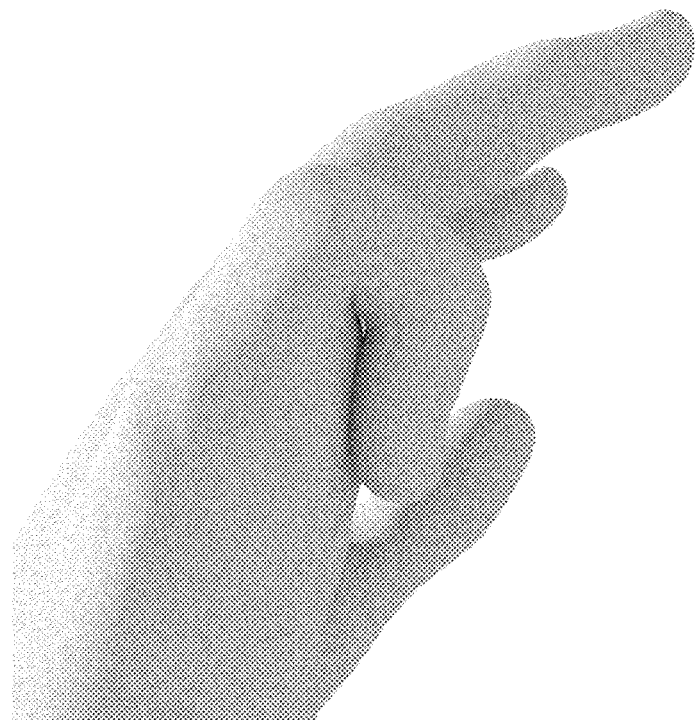
FIGS. 11A and 11B illustrate embodiments of skinning methods applied to a model of a finger.
Figure 11A:
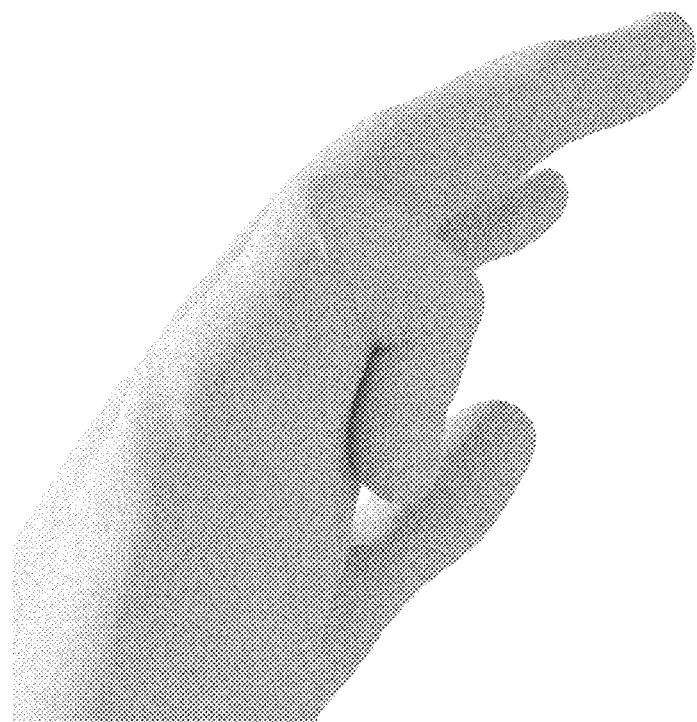

FIGS. 11A and 11B illustrate embodiments skinning methods applied to a model of a finger. Linear blend skinning is applied to FIG. 11A and produces sever interpenetration. FIG. 11B illustrates skinning using position based finite element techniques disclosed herein.

Additional Embodiments

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one embodiment, a method is provide which comprises: receiving a computer representation of an object; calculating a deformation gradient for an element of a plurality of elements; calculating strain energy on the element; and calculating nodal forces on the element. In another embodiment, a non-transitory computer-readable storage medium is provided where the storage medium has stored thereon instructions that, when executed, direct a computing system to perform a method comprising: receiving a computer representation of an object; calculating a deformation gradient for an element of a plurality of elements; calculating strain energy on the element; and calculating nodal forces on the element. In a further embodiment, a computer-implemented system is provided where the system comprises: a data store; and a computing device in communication with said data store that is operative to: receive a computer representation of an object; calculate a deformation gradient for an element of a plurality of elements; calculate strain energy on the element; and calculate nodal forces on the element.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

The following references are hereby incorporated by reference herein:

BELYTSCHKO, T., AND BINDEMAN, L. P. 1993. Assumed strain stabilization of the eight node hexahedral element. *Computer Methods in Applied Mechanics and Engineering* 105, 2, 225-260.

BELYTSCHKO, T., LIU, W., AND MORAN, B. 2000. *Nonlinear Finite Elements for Continua and Structures*. Wiley.

CHAO, I., PINKALL, U., SANAN, P., AND SCHRÖDER, P. 2010. A simple geometric model for elastic deformations. In *ACM SIGGRAPH* 2010 *Papers*, ACM, New York, N.Y., USA, SIGGRAPH 2010, 38:1-38:6.

DICK, C., GEORGII, J., AND WESTERMANN, R. 2011. A hexahedral multigrid approach for simulating cuts in deformable objects. *Visualization and Computer Graphics, IEEE Transactions on* 17,11,1663-1675.

DIZIOL, R., BENDER, J., AND BAYER, D. 2011. Robust realtime deformation of incompressible surface meshes. In *Proceedings of the* 2011 *ACM SIGGRAPH/ Eurographics Symposium on Computer Animation*, ACM, New York, N.Y., USA, SCA 2011,237-246.

GEORGII, J., AND WESTERMANN, R. 2008. Corotated finite elements made fast and stable. In *Proceedings of the 5th Workshop On Virtual Reality Interaction and Physical Simulation*, 11-19.

IRVING, G., TERAN, J., AND FEDKIW, R. 2004. Invertible finite elements for robust simulation of large deformation. In *Proceedings of the* 2004 *ACM SIGGRAPH/Eurographics Symposium on Computer Animation*, Eurographics Association, Aire-la-Ville, Switzerland, Switzerland, SCA 2004,131-140.

KAUFMANN, P., MARTIN, S., BOTSCH, M., AND GROSS, M. 2008. Flexible simulation of deformable models using discontinuous galerkin fem. In *Proceedings of the* 2008 *ACM SIGGRAPH/Eurographics Symposium on Computer Animation*, Eurographics Association, Aire-la-Ville, Switzerland, Switzerland, SCA 2008,105-115.

KAVAN, L., COLLINS, S., ZARA, J., AND O'SULLIVAN, C. 2007. Skinning with dual quaternions. In 2007ACM SIGGRAPH Symposium on Interactive 3D *Graphics and Games*, ACMPress, 39-46.

KIM, T.-Y., CHENTANEZ, N., AND MU 508 LLER-FISCHER, M. 2012. Long range attachments - a method to simulate inextensible clothing in computer games. In *Proceedings of the ACM SIGGRAPH/Eurographics Symposium on Computer Animation*, Eurographics Association, Aire-la-Ville, Switzerland, Switzerland, SCA 2012, 305-310.

MACKLIN, M., AND MULLER, M. 2013. Position based fluids. *ACM Trans. Graph*. 32, 4 (July), 104:1-104:12.

MCADAMS, A., ZHU, Y., SELLE, A., EMPEY, M., TAMSTORF, R., TERAN, J., AND SIFAKIS, E. 2011. Efficient elasticity for character skinning with contact and collisions. In *ACM SIGGRAPH* 2011 *Papers*, ACM, New York, N.Y., USA, SIGGRAPH 2011, 37:1-37:12.

MULLER, M., AND CHENTANEZ, N. 2011. Adding physics to animated characters with oriented particles. 83-91.

MULLER, M., HEIDELBERGER, B., TESCHNER, M., AND GROSS, M. 2005. Meshless deformations based on shape matching. In *ACM SIGGRAPH* 2005 *Papers*, ACM, New York, N.Y., USA, SIGGRAPH 2005,471-478.

MULLER, M., HEIDELBERGER, B., HENNIX, M., AND RATCLIFF, J. 2007. Position based dynamics. *J. Vis. Comun. Image Represent*. 18, 2 (Apr.), 109-118.

MULLER, M., CHENTANEZ, N., AND KIM, T.-Y. 2013. Realtime dynamic fracture with volumetric approximate convex decompositions. *ACM Trans. Graph*. 32, 4 (July), 115:1-115:10.

O'BRIEN, J. F., AND HODGINS, J. K. 1999. Graphical modeling and animation of brittle fracture. In *Proceedings of the 26$^{th}$ Annual Conference on Computer Graphics and*

*Interactive Techniques*, ACM Press/Addison-Wesley Publishing Co., New York, N.Y., USA, SIGGRAPH 1999, 137-146.

PARKER, E. G., AND O'BRIEN, J. F. 2009. Real-time deformation and fracture in a game environment. In *Proceedings of the 2009 ACM SIGGRAPH/Eurographics Symposium on Computer Animation*, ACM, New York, N.Y., USA, SCA '09, 165-175.

RIVERS, A. R., AND JAMES, D. L. 2007. Fastlsm: Fast lattice shape matching for robust real-time deformation. In *ACM SIG GRAPH 2007 Papers*, ACM, New York, N.Y., USA, SIGGRAPH 2007.

RUNGJIRATANANON, W., KANAMORI, Y., AND NISHITA, T. 2010. Elastic rod simulation by chain shape matching with twisting effect. In *ACM SIGGRAPH ASIA 2010 Sketches*, ACM, New York, N.Y., USA, SA 2010, 27:1-27:2.

SIFAKIS, E., AND BARBYC, J. 2012. Fem simulation of 3d deformable solids: A practitioner's guide to theory, discretization and model reduction. In *SIGGRAPH 2012 Courses*.

STOMAKHIN, A., HOWES, R., SCHROEDER, C., AND TERAN, J. M. 2012. Energetically consistent invertible elasticity. In *Proceedings of the ACM SIGGRAPH/Eurographics Symposium on Computer Animation*, Eurographics Association, Aire-la-Ville, Switzerland, Switzerland, SCA 2012, 25-32.

VAILLANT, R., BARTHE, L., GUENNEBAUD, G., CANI, M.-P., ROHMER, D., WYVILL, B., GOURMEL, O., AND PAULIN, M. 2013. Implicit skinning: Real-time skin deformation with contact modeling. *ACM Trans. Graph.* 32, 4 (July), 125:1-125:12.

What is claimed is:

1. A computer-implemented method comprising:
   under control of a computing system comprising a hardware processor,
      receiving, by a game application, user inputs for execution of an electronic command within the game application;
      receiving, by a rendering engine within the game application, computer representations of a plurality of objects for rendering within the game application responsive to the electronic command;
      rendering, by the rendering engine, at least some of the plurality of objects within the game application, wherein rendering individual objects of at least some of the plurality of objects comprises:
         calculating a deformation gradient for an element of a plurality of elements forming the object, wherein calculating the deformation gradient includes calculating a one-point quadrature value at a center of the element;
         calculating elastic energy on the element;
         calculating nodal forces on the element;
         calculating a change in position of the element based in part on the calculated elastic energy and nodal forces of the element;
         calculating a change in velocity of the element based in part on the position of the element;
         calculating a rotation of the element from a first rotational position to a second rotational position such that a second angular momentum of the element in the second rotational position is the same as a first angular momentum of the element in the first rotational position; and
      generating output instructions, by the game application, of a frame comprising the at least some of the plurality of objects rendered by the rendering engine within the game application for a user display.

2. The method of claim 1, wherein the element is a hexahedron.

3. The method of claim 1 further comprising forming a mesh of the computer representation of the plurality of objects, wherein the mesh is formed from the plurality of elements.

4. The method of claim 1, wherein calculating the one-point quadrature value at a center of the element includes using:

$$F^e = \frac{1}{8}\left(\sum_{j=1}^{8} X^j \otimes \xi^j\right)^{-1} \sum_{i=1}^{8} x^i \otimes \xi^i,$$

$$= \frac{1}{8} J^{e-1} \sum_{i=1}^{8} x^i \otimes \xi^i,$$

wherein $x^i$, $X^i$ and $\xi^i$ are the positions of the element in an undeformed and reference configuration.

5. The method of claim 4, wherein calculating the elastic energy comprises calculating using $E \approx V_0 \Psi(Fe)$.

6. The method of claim 4, wherein calculating the nodal forces comprises calculating using $f^i \approx -V_0 P(F^e) J^{E-T} \zeta^i$.

7. The method of claim 1 further comprising determining a material model, the material model comprising at least one of: a co-rotational energy constraint, a stabilization constraint, or a volume constraint.

8. The method of claim 7, wherein the material model comprises a co-rotational energy constraint and a volume constraint, and further comprising:
   applying a shape-preserving stiffness relaxation factor to the co-rotational energy constraint; and
   applying a volume-preserving stiffness relaxation factor to the volume constraint.

9. The method of claim 1, wherein the rendering further comprising calculating a rotation of the element based, at least in part, on a polar decomposition of the deformation gradient.

10. The method of claim 9, wherein the rotation of the element is calculated to not change angular momentum.

11. The method of claim 1 further comprising generating an animation frame for output in a game application based, at least in part, on calculating the deformation gradient, calculating the elastic energy, and calculating the nodal forces for the at least some of the plurality of elements.

12. The method of claim 1, wherein the processor is a graphics processing unit.

13. The method of claim 1 further comprising causing to output the frame at 30 frames per second.

14. A non-transitory computer-readable storage medium having stored thereon instructions that, when executed, direct a computing system to perform a method for rendering frames within a game application, the method comprising:
   receiving, by a rendering engine within the game application, a computer representation of a plurality of object for rendering within the game application;
   rendering, by the rendering engine, at least some of the plurality of objects within the game application, wherein rendering individual objects of at least some of the plurality of objects comprises:
      calculating a deformation gradient for an element of a plurality of elements forming the object, wherein calculating the deformation gradient includes calculating a one-point quadrature value at a center of the element;
calculating elastic energy on the element;
calculating nodal forces on the element;
calculating a change in position of the element based in part on the calculated elastic energy and nodal forces of the element;
calculating a change in velocity of the element based in part on the position of the element; and
calculating a rotation of the element from a first rotational position to a second rotational position such that a second angular momentum of the element in the second rotational position is the same as a first angular momentum of the element in the first rotational position; and
generating output instructions, by the game application, of a frame comprising the at least some of the plurality of objects rendered by the rendering engine within the game application for a user display.

15. The non-transitory computer-readable storage medium of claim 14 further comprising determining a material model, the material model comprising a co-rotational energy constraint, a stabilization constraint, and a volume constraint.

16. The non-transitory computer-readable storage medium of claim 14 further comprising calculating a rotation of the element based, at least in part, on a polar decomposition of the deformation gradient.

17. The non-transitory computer-readable storage medium of claim 14, wherein the calculated rotation of the element does not change an angular momentum.

18. A computer-implemented system, the system comprising:
a data store comprising game application data; and
a computing device in communication with said data store that is configured to execute a game application based in part on the game application data, the game application configured to:
receive computer representations of a plurality of objects for rendering within the game application;
render at least some of the plurality of objects within the game application, wherein rendering individual objects of the at least some of the plurality of objects comprises:
calculating a deformation gradient for an element of at least some of a plurality of elements forming the object, wherein calculating the deformation gradient includes calculating a one-point quadrature value at a center of the element;
calculating elastic energy on the element;
calculating nodal forces on the element;
calculating a change in position of the element based in part on the calculated elastic energy and nodal forces of the element; and
calculating a change in velocity of the element based in part on the position of the element; and
calculating a rotation of the element from a first rotational position to a second rotational position such that a second angular momentum of the element in the second rotational position is the same as a first angular momentum of the element in the first rotational position; and
generate output instructions for a frame comprising the at least some of the plurality of objects rendered within the game application on a user display.

19. The system of claim 18, wherein the computing device is further configured to calculate a rotation of the element based, at least in part, on a polar decomposition of the deformation gradient.

20. The system of claim 19, wherein the computing device is further configured to generate the output instructions for the frame for output in a game application operating on the computing system based, at least in part, on calculation of the deformation gradient, calculation of the elastic energy; and calculation of the nodal forces for the plurality of elements.

* * * * *

UNITED STATES PATENT AND TRADEMARK OFFICE
CERTIFICATE OF CORRECTION

PATENT NO. : 9,990,754 B1
APPLICATION NO. : 14/614375
DATED : June 5, 2018
INVENTOR(S) : Tom Waterson et al.

It is certified that error appears in the above-identified patent and that said Letters Patent is hereby corrected as shown below:

In the Specification

In Column 7, Line 42 (approx.), change "$V_0 8$" to --$V_0 \approx 8$--.

In Column 7, Line 50 (approx.), change "$(C(x^1 ..., x^n)=0)$" to --$(C(x^1,..., x^n)=0)$--.

In Column 7, Line 50 (approx.), change "$(C(x^1 ..., x^n) \geq 0)$" to --$(C(x^1,..., x^n) \geq 0)$--.

In Column 7, Line 55, change "$w^i \approx 1 m^i$" to --$w^i = 1/m^i$--.

In Column 9, Line 30 (approx.), change "$k_x$" to --$k_s$--.

In Column 10, Line 15, change "$x_c^i = x_i - P_c^t$" to --$x_c^i = x^i - P_c^t$--.

In Column 12, Line 53, change "$\xi$" to --$\xi^v$--.

In the Claims

In Column 18, Line 27 (approx.), Claim 6, change "$f^i \approx -V_0 P(F^e) J^{E-T} \xi^i$." to --$f^i \approx -V_0 P(F^e) J^{e-T} \xi^i$.--.

Signed and Sealed this
Nineteenth Day of March, 2019

Andrei Iancu
*Director of the United States Patent and Trademark Office*